United States Patent [19]
Emmons et al.

[15] 3,689,532
[45] Sept. 5, 1972

[54] PROCESS FOR POLYOXYALKYLATION

[72] Inventors: William D. Emmons, Huntingdon Valley, Pa. 19006; George A. Frank, Fort Washington, Pa. 19034

[73] Assignee: Rohm and Haas Company, Philadelphia, Pa.

[22] Filed: Oct. 14, 1969

[21] Appl. No.: 866,382

Related U.S. Application Data

[63] Continuation-in-part of Ser. No. 624,151, March 20, 1972, abandoned.

[52] U.S. Cl. ....260/485 G, 260/29.6 H, 260/29.6 SQ, 260/410.6, 260/458, 260/485 F, 260/485 J, 260/486 B, 260/496, 260/952
[51] Int. Cl. ....C07c 69/40, C07c 69/52, C07c 69/54
[58] Field of Search ............260/485 G, 485 F, 486 B

[56] References Cited

UNITED STATES PATENTS 2,910,490    10/1959    Malkemus .............260/485 G

FOREIGN PATENTS OR APPLICATIONS 963,902    7/1964    Great Britain .........260/485 G

*Primary Examiner*—Lorraine A. Weinberger
*Assistant Examiner*—E. Jane Skelly
*Attorney*—G. W. F. Simmons, C. A. Castellan and A. R. Eglington

[57] ABSTRACT

This invention relates to a process for the polyoxyalkylation of aliphatic acids, and $\alpha,\beta$-unsaturated carboxylic acids in two stages. Monooxyalkylation is conducted with a quaternary ammonium salt catalyst, followed by the introduction of a boron trifluoride catalyst to effect the polyoxyalkylation stage. In one example, polymerizable emulsifying agents are prepared according to this invention which are nonionic $\alpha,\beta$-unsaturated dicarboxylic acid esters, having a hydrophilic non-ionic polyoxyalkyl radical portion alpha to or conjugated with a polymerizable double bond, and a hydrophobic ester radical portion beta to or unconjugated with the polymerizable double bond. Polymerdispersions thus formed may be used in the preparation of coating, impregnating and binding compositions.

6 Claims, No Drawings

PROCESS FOR POLYOXYALKYLATION

This is a continuation-in-part of our copending application Ser. No. 624,151, filed Mar. 20, 1967, now abandoned.

This invention relates to novel polymerizable surface active compounds having both a hydrophilic ester radical portion and a hydrophobic ester radical portion, to methods for their preparation, and to internally stabilized homopolymers and copolymers formed therefrom. In particular, this invention relates to non-ionic polymerizable $\alpha,\beta$-unsaturated dicarboxylic acid esters having an internal structural mechanism for predetermining their hydrophile-lyophile balance and capable of polymerically combining with copolymerizable ethylenically unsaturated compounds dispersed in an aqueous medium to provide a very stable latex containing polymer particles comprising the non-ionic polymerizable surfactant as an immobile integral component of the polymer.

The advantages of using an emulsifying agent that is bound to the polymer in such a manner as to prevent migration of the dispersing agent on coagulation and thus avoid the difficulties encountered in the use of soap as an emulsifying agent are described in U.S. Pat. No. 2,868,755. Emulsifying agents such as soap have been extensively used in water as a dispersing agent. Suitable initiating agents are added to this emulsion of the monomer in water, which results in the formation of polymer particles, which are protected from coagulation by a layer of adsorbed emulsifying agent. The dispersion of such protected polymer particles is termed a synthetic latex. The emulsifying agent thus functions initially to dissolve the monomer in the micelles formed in the dispersing medium and subsequently to protect the polymer particles so formed.

Soaps, such as potassium laurate and sodium abietate, etc. are in no case chemically bound to the polymer but are simply adsorbed on the surface of the polymer particles and when the resulting latex is coagulated, as for example by adding acids or multi-valent cations, the emulsifying agent contributes little to the strength or adhesion of the coagulated polymer, but instead may itself, or by virtue of the decomposition products formed, continue to insulate the particles from one another in the coagulum. The reaction product of the prior emulsifying agent with certain coagulating agents migrates within the solid polymer to form aggregates which further weaken the mechanical properties of the polymer. When the latex is evaporated as a film, migration of the emulsifying agent to the surface of the film has a deleterious effect upon several properties such as adhesion and resistance to water spotting.

The prior art discloses the use of sulfo-esters of monocarboxylic acids of the formula

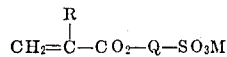

where R is hydrogen, a halogen atom or an organic radical, Q is a bivalent organic radical having its valence bonds on two different carbon atoms, such as an alkylene radical, and M is hydrogen, an ammonium base or a metal, to form interpolymers with different polymerizable ethylenically unsaturated compounds. It has been disclosed that the incorporation of the carboxylic acid sulfo-ester in a hydrophobic ethylenically unsaturated monomer provides a copolymer having an increase in hydrophilic properties. The degree of variation of the hydrophilic properties is directly related to the percent by weight of the carboxylic acid sulfo-ester in the monomer mixture.

In accordance with this invention it has been discovered that certain polymerizable ethylenically unsaturated compounds comprising a hydrophilic nonionic polyoxyalkyl radical portion, or a hydrophilic portion consisting of a nonionic polyoxyalkyl radical in linear sequence with an anionic sulfo-ester radical or an anionic phosphoro-ester radical in an alpha or conjugated relationship to a polymerizable double bond together with a hydrophobic ester radical portion in a beta or unconjugated relationship with the polymerizable double bond of the formula

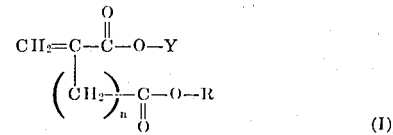

where $n$ is an integer 1 or 2, R is a $C_1$—$C_{22}$ alkyl radical, a fluoro-substituted alkyl radical having the structure —$CH_2(CF_2)_xH$ where $x$ is an even integer from 2 to 10, or a radical having the structure

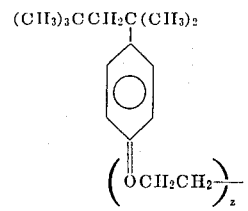

where $z$ is an integer from 1 to 40, and Y is a radical selected from $+CH_2CH_2O+_mH$, $+CH_2CH(CH_3)O+_pH$, $+CH_2CH(CH_3)O+_{m'}+CH_2CH_2O+_{m''}H$, $+CH_2CH_2O+_mSO_3M$, $+CH_2CH(CH_3)O+_{m'}+CH_2CH_2OB+_{m''}SO_3M$, $+CH_2CH_2O+_mPO(OM)_2$, $+CH_2CH(CH_3)O+_{m'}+OH_2CH(2O+_{m''}PO(OM)_2$ where $m$ and $p$ are integers from 1 to 50, $m'$ and $m''$ are integers from 1 to 49, with the proviso that the sum of $m'$ and $m''$ does not exceed 50, and M is hydrogen, an alkali metal or a combination thereof, can be structurally adapted to provide a variable or predetermined hydrophile-lyophile balance merely by changing the structure of the hydrophobic ester radical R which is bound to the carboxyl group beta to or unconjugated with the polymerizable double bond, or by changing the structure of the hydrophilic ester radical Y which is bound to the carboxyl group alpha to or conjugated with the polymerizable double bond. The net balance of the hydrophilic properties imparted by the Y substituent and the hydrophobic properties imparted by the R substituent may be predetermined by carefully selecting and varying the R or Y substituents.

The compounds prepared according to this invention may be sequentially prepared because of the substantial differential in reactivity of the carboxyl groups in the conjugated and unconjugated positions of the dicarboxylic acids used as starting materials. For example, itaconic acid possesses one carboxyl group that is more susceptible to a nucleophilic attack than is the other carboxyl group. Thus, the monoalkyl itaconate is first formed with the hydrophobic ester radical bound to the carboxyl group in the unconjugated position.

We have discovered that in proceeding from the mono-alkyl stage to the mono-alkyl (polyoxyalfyl) stage, it is not possible to obtain satisfactory yields of the polyoxyalkyl product using simply a single catalyst system, such as a quaternary a quaternary ammonium salt or a boron fluoride. Thus, in attempting to follow the teaching of British Patent 963,902 (1964), wherein $BF_3 \cdot ET_2$ was used as the sole catalyst at 85° C., it provided a polyoxyalkylated ester, but the final product contained up to about 42 per cent unreacted starting acid.

When a quaternary ammonium salt was used as the sole catalyst, it only catalyzed the reaction of an epoxide with acids to the first stage of alkoxylation; i.e., to the mono-alkyl ester (Formula II below)

We have found that by using a quaternary ammonium salt catalyst in the first alkoxylation reaction, wherein the mono-oxyalkyl intermediate is formed, and thereafter introducing into the reaction mixture a boron fluoride catalyst to continue the alkoxylation reaction, preferably present in the weight proportion of from about 0.5 to about 5.0 percent by weight, a high degree of alkoxylation is achieved, and the final polyoxyalkylated product contains no unreacted acid.

The following reaction sequence is representative of one class of compounds preparable by the novel process of this invention:

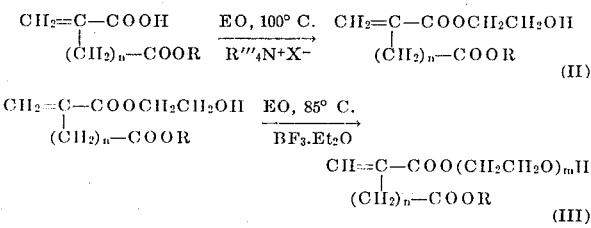

where R, n and m are defined above in Formula I. This increased alkoxylation of the mono-oxyalkyl ester (step 2 above) can be accomplished in the temperature range of 60° to 100° C., preferably about 85° C. by the addition of the second catalyst, $BF_3 \cdot ET_2O$, followed by pumping in the particular epoxide.

Compounds of this invention containing the sulfate ester radical and the phosphate ester radical as defined in formula (I) above, may be prepared using respectively sulfamic acid or polyphosphoric acid to react with the polyoxyethylated itaconate (III).

Similarly, the following sequence depicts another class of compounds preparable by the novel process of this invention, employing ethylenically unsaturated monocarboxylic acids:

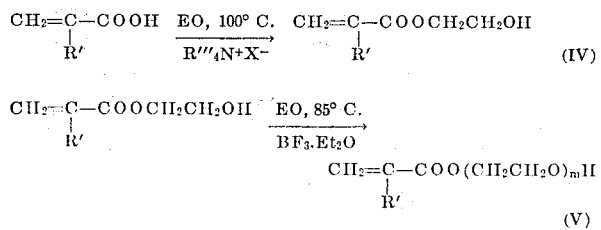

wherein R' is hydrogen or lower alkyl up to four carbons.

Representative of ethylenically unsaturated acids which may be alkyloxylated are acrylic acid, methacrylic acid, ethylacrylic acid, propylacrylic acid, and butylacrylic acid.

The following sequence depicts yet another class of compounds preparable by the novel process of this invention, employing aliphatic acids as follows:

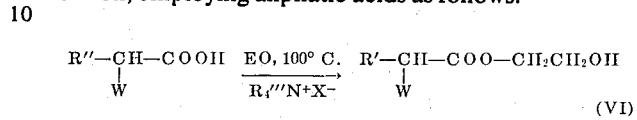

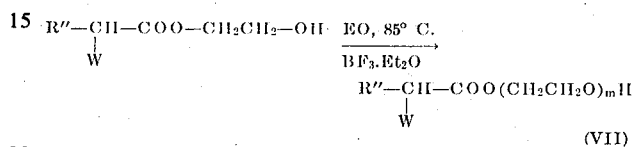

wherein R'' is alkyl straight or branched from one to 21 carbons; and W is hydrogen, alkyl to four carbons or $-(CH_2)_n-COOR$, in which n, R and m are defined as in Formula I above.

Representative of aliphatic acids which may be thusly alkoxylated are: propionic acid, butyric acid, isobutyric acid, pentanoic acid, isoamyl acid, caprioc acid, caprylic acid, pelargonic acid, capric acid, lauric acid, myristic acid, palmitic acid, stearic acid, arachidic acid, monomethyl succinate, monoethyl succinate, monolauryl succinate, monomethyl glutarate, and monoethyl glutarate.

All the foregoing classes of compounds are conveniently grouped into two generic structural formulae, as follows:

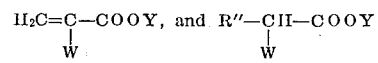

wherein R'', Y and W are as defined in relation to Formula I above.

The compounds of this invention are incorporated into emulsion polymerization systems either with or without other emulsifying agents wherein they function as emulsion stabilizers and are polymerized into the polymer chain to provide a stable latex of polymer particles comprising the polymerizable surfactant as an immobile integral component of the polymer.

When the compounds of this invention are incorporated into the polymer chain in a proportion from about 1 percent to about 6 percent by weight, based on the weight of the monomer mixture, the resulting latex is characterized by greater stability, very low foaming properties and excellent pigment compatibility.

Polymers prepared from monomeric mixtures comprising from about 6 to about 50 percent by weight, based on the weight of the monomer mixture, of the mixed esters of this invention are useful in, for example antistatic compositions and in dry-cleaning solvent-resistant compositions.

Emulsion polymers having the same backbone and particle size as emulsion polymers comprising the polymerizable surfactants of this invention do not possess the desirable characteristics noted above. For example, when air is blown through latices prepared with the compounds of this invention and similarly blown through latices prepared with saturated, physically adsorbed soaps according to the method described below, the latices of this invention exhibit significantly lower foaming characteristics. The following Table I represents the results of a foaming test where a latex of this invention (latex C) is compared with latices using its saturated analog (latex B) and a conventional prior art emulsifier (latex A). The degree of foaming is represented by the time required for the head of foam, generated by air bubbling through a 1 mm. orifice at 40 ml./min. rate, into 20 ml. of the emulsion placed in a 100 ml. graduated cylinder, to reach the 100 ml. mark.

TABLE I

| Latex | Emulsifying Agent | Amt. of Foam | Total Collapse of Foam |
|---|---|---|---|
| A | 6 wt.% octylphenoxypolyethoxyethyleneglycol having 40 Ethylene oxide units | 100 ml./ 120 sec. | 618 sec. |
| B | 5 wt.% polyoxyethylated lauryl succinate having 26 ethylene oxide units | 100 ml./ 156 sec. | 240 sec. |
| C | 5 wt.% polyoxyethylated lauryl itaconate having 26 ethylene oxide units | 77 ml./ 600 sec. | 198 sec. |

Additional support for the statement of advantageous properties possessed by the latices of this invention is based upon the behavior of latices A, B, and C in Table I when they are each independently mixed with a paste consisting of $TiO_2$ and water. The mixture of latex A and the pigment paste coagulated completely. The mixture of latex B and the pigment paste also coagulated completely. The latex formed with the polymerizable soap of this invention, latex C, when mixed with the pigment paste formed a thin thixotropic emulsion that slowly thickened on standing, but upon stirring it became fluid and free-flowing.

Representatives of the polymerizable dicarboxylic acids that may be used as starting materials to make the monomeric mixed esters of this invention are itaconic acid, alpha-methylene glutaric acid, fumaric acid, and other polymerizable mono-olefinic dicarboxylic acids.

Representative of ethylenically unsaturated acid esters which may be alkyloxylated are acrylic acid and methacrylic acid.

Representatives of the polymerizable ethylenically unsaturated compounds that can be copolymerized with the polymerizable surface-active mixed esters of this invention are ethylene, the styrene compounds, the ethylenically unsaturated acids and derivatives such as the acrylic and methacrylic acids and salts, acrylic and methacrylic esters, acrylic and methacrylic nitriles, acrylic and methacrylic amides, acrylic and methacrylic anhydrides, maleic esters, maleic anhydride, maleic acid polyesters, unsaturated alcohol esters, unsaturated ketones, and other compounds containing one or more ethylenic linkages capable of addition polymerization. Specific examples of such ethylenically unsaturated compounds are ethylene, styrene, a-methylstyrene, vinylnaphthalene, vinylbenzenesulfonic acid, hydroxystyrene, methoxystyrene, aminostyrene, cyanostyrene, acetylstyrene, monochlorostyrene, dichlorostyrene and other halostyrenes, acrylic acid and salts, methacrylic acid and salts, methyl methacrylate, ethyl acrylate, hexyl acrylate, lauryl methacrylate, phenyl acrylate, allyl acrylate, acrylonitrile, methacrylonitrile acrylamide, methacrylamide, acrylanilide, acrylic anhydride, ethyl a-chloroacrylate, ethyl maleate, maleic anhydride, polyglycol maleate, diallyl fumarate, vinyl acetate, vinyl propionate, vinyl butyrate, vinyl benzoate vinyl chloride, vinyl bromide, vinylidene chloride, vinylidene bromide, vinylidene cyanide, vinyl methyl ketone, methyl isopropenyl ketone, vinyl carbazole, vinyl ethyl ether, isobutylene, 1,3-butadiene, isoprene, and the like.

The improved polymers of this invention may be prepared by conventional methods of polymerization, such as emulsion polymerization or solution polymerization. In most instances the starting composition is agitated and the temperature is raised; e.g., to a temperature in the range from 40° C. to 100° C. to activate the polymerization, although in some instances, particularly those wherein the composition comprises a very active polymerization catalyst, the polymerization can occur at or below room temperature.

The invention contemplates embodiments in which all of the constituents are charged to the starting mixture, and are polymerized therein in a single step, as well as embodiments in which the constituents are charged in a sequence, perhaps coordinated with a polymerization sequence, and/or the polymerization is carried out in plurality of stages.

The invention contemplates that the starting composition comprising the polymerizable material may contain polymerization catalysts of kinds already known to promote emulsion polymerizations. Among such catalysts are water-soluble oxidizing agents such as hydrogen peroxide and potassium persulfate and catalysts which, like the redox catalysts, are activated in the water phase; e.g., by a water-soluble reducing agent.

The invention contemplates that the aqueous composition may optionally contain conventional emulsifiers, wetting agents, surfactants, and the like, although such constituents can be omitted from the starting composition and, if used, can usually be employed in smaller proportions, in accordance with this invention, than is possible with known processes.

These aqueous emulsions are characteristically very stable; i.e., resistant to coagulation of the colloidally dispersed polymer particles, even though they contain little or no conventional emulsifier or stabilizer. In many instances, the polymer dispersions can be mixed with concentrated calcium chloride solutions without causing coagulation of the polymer. In many instances, the dispersion can be vigorously agitated without coagulation under conditions that cause substantial precipitation of ordinary dispersions. In instances where the dispersions contain little or no conventional water-soluble emulsifier, the dispersions often have little or no tendency to foam. When the polymer dispersions are obtained from starting compositions that were substantially free of water-soluble soaps, wetting agents, stabilizers, and like external solutes, the resulting polymers are likewise substantially free of such external solutes. and are advantageously employed where such solutes are undesirable; e.g., in coatings that are resistant to water.

The latex products; i.e., aqueous polymer dispersions obtained in accordance with this invention are useful for a number of purposes. For example, some of the latex dispersions are useful in the preparation of coating, impregnating and binding compositions, or in the coating of films and the like. Other compositions can be treated; e.g., by spray or other drying, to obtain a dry polymeric product useful in molding or for other purposes. The compounds of this invention may also be used as antistatic agents for textiles and plastics, as sizing agents and as dye assistants.

To assist those skilled in the art to practice the present invention, the following modes of operation are suggested by way of illustration, parts and percentages being by weight and the temperature in ° C. unless otherwise specifically noted.

1. A mixture of about 50 gm. lauryl hydrogen itaconate (LHI - 0.17 mole), about 0.45 gm. tetrapropylammonium bromide (TPAB - 1 mole percent based on LHI), about 9 gm. ethylene oxide (EO - 0.2 mole), 0.05 gm. 2,6-di-tert-butyl-4-methyl phenol (butylated hydroxytoluene - 1,000 ppm based on LHI) and about 60 gm. benzene are placed in a one-liter Parr bomb. The system is closed and heated, with stirring, at about 100° C. for about 5 hours. The reaction mixture is cooled to room temperature and about 0.3 gm. BHT and about 2.5 gm. boron tri-fluoride etherate ($BF_3 \cdot Et_2O$) are added to the reaction mixture. The system is again closed and the contents of the receptacle are heated to about 85° C. and about 400 gm. EO is added to the reaction mixture at a rate of about 400 gm. per hour. The reaction mixture is further heated at about 85° C. for an additional 30 minutes. The reaction mixture is cooled and concentrated to provide about 250 gm. of an oily polyoxyethylated lauryl itaconate, having 26 ethylene oxide units, which solidifies to a white wax on standing.

2. A mixture of about 298 gm. lauryl hydrogen itaconate (LHI - 1.0 mole), about 2.7 gm. lauryl hydrogen itaconate (LHI- 1.0 mole), about 2.7 gm. tetrapropylammonium bromide (TPAB - 1 mole percent based on LHI), about 53 gm. ethylene oxide (EO - 1.2 moles), about 0.3 gm. 2,6-di-tert-butyl-4-methyl-phenol (butylated hydroxytoluene - 1,000 ppm based on LHI) and about 343 gm. benzene are placed in a one-liter Parr bomb. The system is closed and heated, with stirring, at about 100° C. for about 5 hours. The reaction mixture is cooled to room temperature and concentrated to provide about 324 gm. of a water-clear liquid. About 50 gm. of the water-clear liquid is mixed with about 0.5 gm. BHT, about 2.2 gm. $BF_3 \cdot Et_2O$ and about 50 ml. toluene and placed in the 1 liter Parr bomb. The system is again closed and the contents of the receptacles are heated to about 85° C. The temperature is maintained at about 85° C. and about 420 gm. EO is added to the reaction mixture at a rate of about 400 gm. per hour. The reaction mixture is further heated at about 85° C. for an additional 30 minutes. The reaction mixture is cooled and concentrated to provide about 276 gm. of an oily polyoxyethylated lauryl itaconate having 34 ethylene oxide units which solidifies to a white wax on standing.

3. To a solution of 0.2 gm. benzoyl peroxide (BPO) in 40 gm. toluene is added about 20 gm. of the polyoxyalkyl lauryl itaconate formed in procedure (1) above. The mixture is heated to about 100° C. in a nitrogen atmosphere for about 2 hours. The reaction mixture is recatalyzed with six successive hourly additions of about 0.04 gm. BPO to complete the polymerization reaction and provide a homopolymer of the product of the procedure (1) above. The percentage monomer conversion is about 95.5 percent.

4. A polyoxyalkyl compound of this invention may be used in high concentration, such as 50 wt. percent of the monomer, to impart its hydrophilic properties to an emulsion. In addition, it concurrently acts as a surfactant; however, an external surfactant may also be used. The following procedure exemplifies this embodiment of the invention.

To a 200 ml. solution of 6 gm. octylphenoxypolyethoxyethyleneglycol having 40 EO units is added 50 gm. ethyl acrylate (EA) and 50 gm. polyoxyethylated methyl itaconate (POEMI) having 28 ethylene oxide units. The emulsion is sparged with nitrogen for about 30 minutes and the polymerization is initiated at about 27° C. with about 0.5 gm. ammonium persulfate, about 0.5 gm. sodium hydrosulfite, and about 2 ml. of a freshly prepared $FeSO_4$ solution consisting of about 0.18 gm. FeSO4 per 100 ml. water. The polymerization is completed with 3—5 drops of tert-butyl hydrogen peroxide. The solids content of the EA/POEMI copolymer is about 33 percent.

5. To 43 gm. of refluxing toluene is added over a two hour period about 90 gm. styrene (S), about 10 gm. polyoxyethylated butyl itaconate (POEBI) having 22 ethylene oxide units and about 1 gm. benzoyl peroxide (1 percent weight based on the weight of monomers). The polymerization is allowed to continue for about 7 hours during which period the reaction mixture is recatalyzed with four 0.2 gm. portions of benzoyl peroxide. The reaction mixture is diluted to 50 percent solids with toluene. The final S/POEBI copolymer exhibits a viscosity of Q on the Gardner-Holdt scale. The percentage conversion of monomers is about 99 percent.

6. A mixture of about 100 gm. ethyl acrylate (EA), about 100 gm. methyl methacrylate (MMA), about 10 gm. polyoxyethylated lauryl a-methyleneglutarate having 26 ethylene oxide units (POELMG - 5 percent by weight based on weight of monomer) and about 367 gm. deionized water is sparged with nitrogen for about 15 minutes. The polymerization is initiated at about 23° C. with about 1 gm. ammonium persulfate, about 1 gm. sodium metabisulfite, and about 4 ml. of $FeSO_4$ solution (0.18 percent). Polymerization is allowed to continue for about 1 hour and the reaction mixture is allowed to cool to room temperature. The solids content of the EA/MMA/POELMG copolymer is about 35 percent.

7. The following procedure exemplifies an additional embodiment of the invention; namely, the preparation of the sulfate ester of polyoxyalkylated mono-esters of polymerizable dicarboxylic acids. A mixture of about 179 gm. polyoxyethylated lauryl itaconate having 26 ethylene oxide units (POELI0.1 mole) and about 11 gm. sulfamic acid (0.1 mole) is heated to about 140° C. for about 4 hours. During the heating, ammonia is liberated to form the ammonium salt of the sulfate ester. The final product is laurylitaconoxy (polyethoxyethyl) sulfate.

8. To a stirred melt of about 34 gm. hydroxyethyl lauryl itaconate (0.1 mole) maintained at about 40° C. is added dropwise, over a one hour period, about 17 gm. polyphosphoric acid (0.1 mole based on $P_2O_5$). The reaction is carried out for about four hours at about 95° C. The reaction is then cooled, dissolved in ether and extracted with water to remove by-product phosphoric acid. The ethereal extract is concentrated to provide about 24 gm. of mono(laurylitaconoxyethyl) phosphate having the formula:

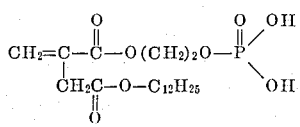

9. A mixture of about 179 gm. polyoxyethylated lauryl itaconate having 26 ethylene oxide units (POELI - 0.1 mole) and 17 gm. polyphosphoric acid (0.1 mole based on $P_2O_5$) is stirred at about room temperature for about 24 hours and the reaction product is concentrated to provide lauryllitaconoxy (polyethoxyethyl) phosphate.

10. A mixture of about 30 gm. lauryl hydrogen itaconate, about 5 gm. ethylene oxide, about 0.3 gm. tetrapropylammonium bromide, about 0.04 gm. 2,6-di-t-butyl-4-methyl phenol (butylated hydroxytoluene), and about 70 gm. benzene are placed in a 1liter Parr bomb. The system is closed and heated, with stirring, at about 100° C. for about 5 hours. The reaction mixture is cooled to room temperature and about 4 gm. boron trifluoride etherate ($BF_3 \cdot Et_2O$) is added. The system is again closed and the contents of the receptacle are heated to about 85° C. The temperature is maintained at about 85° C. and successively propylene oxide and ethylene oxide are each pumped into the bomb at the rate of 400 gm. per hour, each for a period of about 40 minutes. The reaction mixture is further heated at about 85° C. for an additional 30 minutes. The reaction mixture is cooled and concentrated to provide about 140 gm. of a sequentially polyoxypropylated-polyoxyethylated laurylitaconate having 9 propylene oxide units and 14 ethylene oxide units.

11. A mixture of about 57.3 gm. of lauryl hydrogen succinate (LHS - 0.2), about 0.53 gm. of tetrapropylammonium bromide (TPAB - 1 mole percent, based on LHS), about 10.6 gm. of ethylene oxide (0.24 mole), and about 58.4 gm. of toluene are placed in a one-liter Parr bomb. The system is closed and heated, with stirring, at about 100° C. for about 13 hours. The reaction mixture is cooled to room temperature providing 67 gm. of monoethoxylated lauryl succinate after concentration.

37.6 gm. of hydroxy ethyl lauryl succinate (0.114 mole) is dissolved in 50 gm. of toluene. This solution is mixed with about 1.5 gm. of $BF_3 \cdot Et_2O$ placed in a 1 liter Parr bomb. The system is again closed and the contents of the receptacle are heated about 85° C. This temperature is maintained at about 85° C., and about 367 gm. of ethylene oxide is added to the reaction mixture at a rate of about 400 gm. per hour. The reaction mixture is further heated at about 85° C. for an additional 30 minutes. The reaction mixture is cooled and concentrated to provide about 205 gm. of oily polyoxyethlated lauryl succinate, having 34 ethylene oxide units (Formula VII) which solidifies to a white wax on standing.

13. Into a 1 liter Parr bomb is charged 16.5 gm. hydroxyethyl methacrylate (0.127 mole), about 75 milliliter of toluene, about 0.2 gm. of butylated hydroxytoluene (BHT) and about 0.32 gm. of $BF_3 \cdot Et_2O$. The system is closed and the contents heated to about 85° C. Maintaining this temperature, about 391 gm. EO is added at a rate of about 400 gm. per hour. The reaction mixture is further heated at about 85° C., for an additional 30 minutes. The reaction mixture is cooled and concentrated to provide 131 gm. of polyoxyethyllated methacrylic acid, having 23 EO units. (Formula V)

It is to be understood that changes and variations may be made without departing from the spirit and scope of the invention as defined by the appended claims.

What is claimed is:

1. A process for the preparation of a compound having the formula:

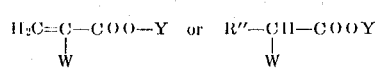

wherein R'' is alkyl, straight or branched, from one to 21 carbons; W is —$(CH_2)_n$—COOR in which n is the integer one to two in which R is a $C_1$—$C_{22}$ straight or branched alkyl radical; a fluoro-substituted alkyl radical having the structure —$CH_2CCF_2)_xH$, in which x is an even whole integer from 2 to 10; or a radical having the structure

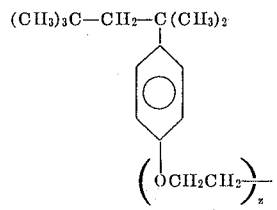

in which Z is an integer from 1 to 40; and Y is a radical selected from one of —$(CH_2CH_2O-)_mH$, $[-CH_2CH(CH_3)O-]_pH$, and $[-CH_2CH(CH_3)O]_{m'}$ $CH_2CH_2O)_{m''}$ H, in which m and p are a whole integer from 1 to 50, m' and m'' are whole integers from 1 to 49, with the proviso that the sum of m' and m'' does not exceed 50; comprising:

a. heating a compound having either of the formulas

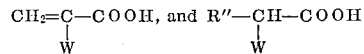

in which W and R'' are as previously defined, with an alkylene oxide selected from one of ethylene oxide, propylene oxide, and mixtures thereof, in the presence of a quaternary ammonium salt catalyst to form a mono-oxyalkyl product, and b. maintaining the reaction mixture in the range of 60° to 100°C. while continuing the addition of said alkylene oxide or oxides, in the presence of an added boron fluoride catalyst, to form the above defined polyoxyalkylated products.

2. A process according to claim 1 wherein W is -$(CH_2)_n$-COOR, n is one, and R is a straight alkyl radical.

3. A process according to claim 1 wherein said step (b) is carried out at about 85° C.

4. A process according to claim 1 wherein said alkylene oxide is ethylene oxide.

5. A process according to claim 1 wherein the quaternary ammonium salt is present in the weight proportion of from about 0.5 to about 5.0 percent by weight, based on the weight of the starting acid.

6. A process according to claim 1 wherein the boron fluoride catalyst is present in the weight proportion of from about 0.5 to about 5.0 percent by weight, based on the weight of the mono-oxyalkyl intermediate.

* * * * *